(12) United States Patent
Cohen

(10) Patent No.: US 7,731,265 B1
(45) Date of Patent: Jun. 8, 2010

(54) AUXILIARY SUN VISOR ATTACHMENT AND ASSOCIATED METHOD

(76) Inventor: Brian D. Cohen, 490 Main St., Apt. A2, Farmingdale, NY (US) 11735

( * ) Notice: Subject to any disclaimer, the term of this patent is extended or adjusted under 35 U.S.C. 154(b) by 0 days.

(21) Appl. No.: 12/229,887

(22) Filed: Aug. 27, 2008

Related U.S. Application Data

(60) Provisional application No. 60/966,637, filed on Aug. 30, 2007.

(51) Int. Cl.
*B60J 3/02* (2006.01)
(52) U.S. Cl. ..................... 296/97.6; 296/97.9
(58) Field of Classification Search ............... 296/97.1, 296/97.5, 97.6, 97.8, 97.9, 97.11–97.13
See application file for complete search history.

(56) References Cited

U.S. PATENT DOCUMENTS

| | | | | |
|---|---|---|---|---|
| 3,679,255 A | * | 7/1972 | Nacarato | 296/97.6 |
| 4,090,732 A | * | 5/1978 | Vistitsky | 296/97.8 |
| 5,445,427 A | * | 8/1995 | Vandagriff | 296/97.6 |
| 5,580,117 A | * | 12/1996 | Goclowski | 296/97.6 |
| 6,059,347 A | * | 5/2000 | Davalos | 296/97.6 |
| 6,189,947 B1 | * | 2/2001 | Annan | 296/97.12 |
| 6,189,949 B1 | * | 2/2001 | Miller et al. | 296/97.8 |
| 6,224,137 B1 | * | 5/2001 | Hunker | 296/97.6 |
| 6,899,371 B1 | * | 5/2005 | Hammond | 296/97.6 |

* cited by examiner

*Primary Examiner*—Glenn Dayoan
*Assistant Examiner*—Gregory Blankenship

(57) ABSTRACT

An auxiliary sun visor may include a body and bracket spaced therefrom. The bracket may be removably attached to an existing vehicle sun visor. The apparatus may further include a mechanism for freely articulating the body along an x-axis and a first y-axis and a z-axis, while simultaneously pivoting the bracket about a second y-axis respectively. The mechanism may include a ball joint and a hinge which connects the body and the bracket and permits the body to articulate while the bracket remains stationary. The bracket may be secured to the existing vehicle visor by a plurality of clips with teeth. The body may include a chamber housing a panel. The panel is preferably slidably interfitted into the chamber through a distal open end of the body.

5 Claims, 2 Drawing Sheets

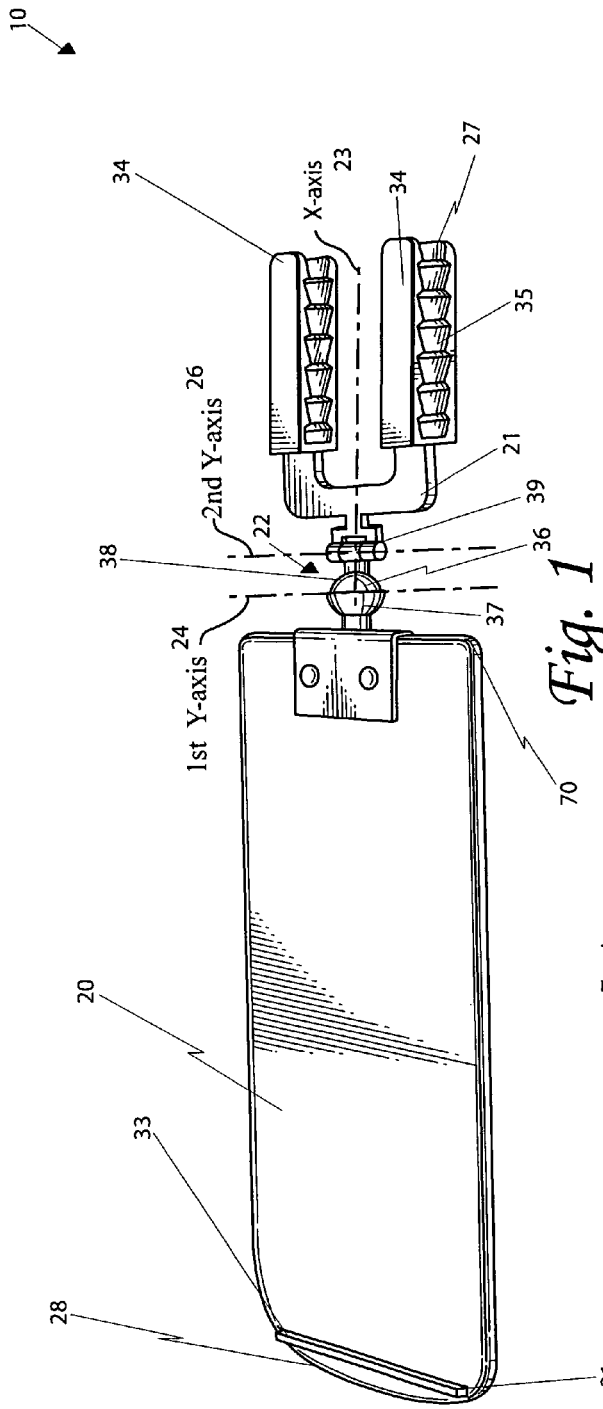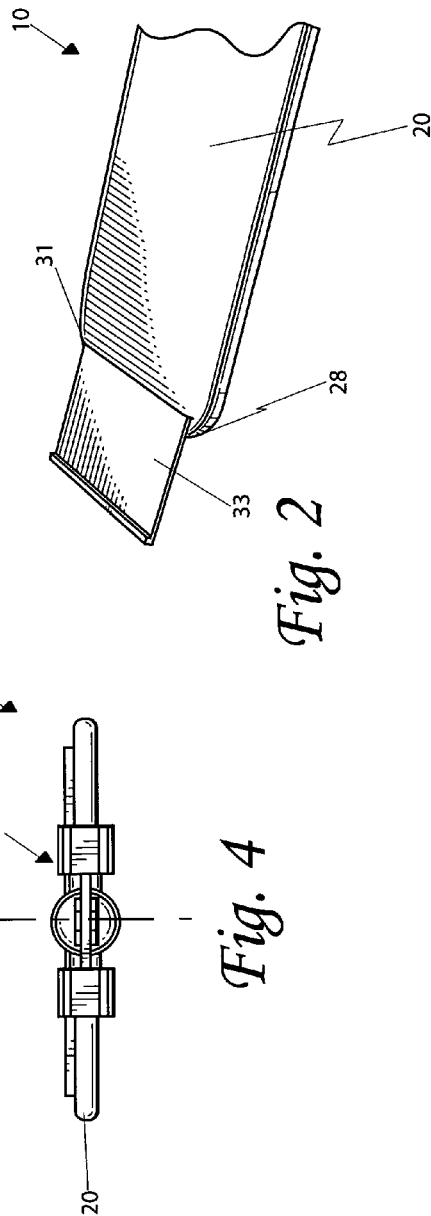

AUXILIARY SUN VISOR ATTACHMENT AND ASSOCIATED METHOD

CROSS REFERENCE TO RELATED APPLICATIONS

This application claims the benefit of U.S. Provisional Application No. 60/966,637, filed Aug. 30, 2007, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION
TECHNICAL FIELD

This invention relates to sun visors and, more particularly, to an auxiliary sun visor for cooperating with an existing sun visor and thereby shielding sunlight in an existing vehicle.

PRIOR ART

As anyone who has ridden in the front seat of an automobile is aware, vehicles are equipped with sun visors that are intended to be used to shield the driver and/or front passenger's eyes from the sun, but often such standard sun visors do not extend low enough to be effective, especially for persons of less than average height. As a result, numerous devices have been developed which can be attached to the existing vehicle sun visor so as to extend the vertical height thereof further downward in its in use position. However, the known sun visor extensions are, for the most part, more complex, and as a result more expensive than they need to be, and many times are not very easy to mount to the vehicle sun visor or to use. Furthermore, many vehicle sun visors are equipped with vanity mirrors which can no longer be used with many of the knew sun visor extensions.

U.S. Pat. No. 4,792,176 to Karford discloses a visor extension unit that is releasably attachable to the conventional sun visor of a motor vehicle. The unit further includes a lateral visor extension panel which is movable through a horizontal guide passage in the visor extension unit so as to effectively increase the windshield area blocked on either side of the sun visor as desired. Also, a glare shield is movable through a separate pocket formed in the extension unit in a downward direction beneath the sun visor to diminish the glare of light which otherwise would pass through the windshield area beneath the visor. Unfortunately, this prior art reference does not disclose a sun visor positionable to block light from entering the side window of the vehicle.

U.S. Pat. No. 5,417,466 to Giantonio discloses a sun visor system for an automotive vehicle comprised of a primary sun visor, which is rotatably affixed in a position proximate with a windshield, and a secondary sun visor, which is rotatable and pivotable from a stowed position against a vehicle headliner panel to a functional position proximate with an adjacent side window. The primary sun visor is restricted from being pivoted toward the vehicle side window. Unfortunately, this prior art reference does not disclose a sun visor that is easily detachable and capable of being used in multiple vehicles.

U.S. Pat. No. 6,189,947 to Annan discloses a device to provide extended sun protection offered by sun visors commonly used in motor vehicles. The apparatus is removably attached to the vehicle sun visor and a panel of the device can be opened to provide protection from sun's rays shining through the vehicle from the side. In this manner, the vehicle's own sun visor can be lowered to offer frontal sun protection while the device offers sun protection from the side. In addition, the device is equipped with another panel that can be extended to provide protection from the sun's rays in the corner space between the front and the side of the vehicle. Unfortunately, this prior art reference may not allow a user to block sunlight entering from any side of the vehicle.

Accordingly, a need remains for an auxiliary sun visor for automobiles and the like in order to overcome the above-noted shortcomings. The present invention satisfies such a need by providing an apparatus that is convenient and easy to use, is durable yet lightweight in design, is versatile in its applications, and provides a means of cooperating with an existing sun visor to thereby shield sunlight in an existing vehicle.

BRIEF SUMMARY OF THE INVENTION

In view of the foregoing background, it is therefore an object of the present invention to provide an apparatus for cooperating with an existing sun visor and thereby shielding sunlight in an existing vehicle. These and other objects, features, and advantages of the invention are provided by an auxiliary sun visor attachment.

An auxiliary sun visor for cooperating with an existing sun visor to thereby shield sunlight in an existing vehicle may include a single and unitary body. The sun visor may also include a bracket spaced from the body and removably attached to a portion of the existing vehicle sun visor. Further, the visor may include a mechanism for freely articulating the body along an x-axis and a first y-axis and a z-axis, while simultaneously pivoting the bracket about a second y-axis respectively. The first and second y-axes may be registered orthogonal to a longitudinal length of the body, while the x-axis may be registered parallel to the longitudinal length of the body. In addition, the first and second y-axes may be spaced apart and intermediately situated between the bracket and the body. Since it may be easily attached to an existing visor, the present invention may eliminate the need to continually reposition the existing visor every time the sun changes position when driving on winding roads, which can be a dangerous distraction to the driver.

The auxiliary sun visor may further include respective distal ends of the bracket and the body remaining spaced apart at a first distance when the body and the bracket are oriented at a coplanar relationship with each other. Also, the visor preferably has the respective distal ends of the bracket and the body remaining spaced apart at a second distance when the body and the bracket are oriented at a non-planar relationship with each other. In the preferred embodiment, the first distance may be greater than the second distance.

The body of the visor further may include a chamber located therein. Such a chamber may have at least one open end located at a distal end of the body. Additionally, a panel may be slidably interfitted within the chamber. The panel may be selectively retracted outwardly from the at least one open end thereof. In this manner, a user may extend the coverage of the sun visor to block out additional sunlight. By blocking the sun's harmful ultra-violet rays, the apparatus protects the eyes from potential dangerous overexposure to the sun.

The bracket of the visor preferably is U-shaped and may include a plurality of clips attached to lateral ends thereof. Each of the clips may have a plurality of teeth used to grip about the existing vehicle sun visor so that the bracket may remain statically engaged therewith while the body may be freely articulated along the x-axis and the first y-axis and the z-axis respectively.

The freely articulating mechanism of the visor may further include a ball joint. Such a ball joint may have a female member statically affixed to the proximal end of the body and a male member rotatably attached to the female member. A hinge may also be included and statically affixed to the male member and the bracket respectively. Such a hinge may have a fulcrum axis defined along the second y-axis. The x-axis and the y-axis and the z-axis, about which the body may travel, preferably intersect at the ball joint.

Additionally, the ball joint and the hinge preferably are pivotally affixed to each other such that the body and the bracket may be independently rotated with respect to each other by independently articulating the ball joint and the hinge respectively. The body preferably is freely biased along the x-axis and the y-axis and the z-axis while the hinge may be maintained at a fixed position.

Further, the bracket may be pivoted about the x-axis by rotating the male member with respect to the female member. The bracket may also be pivoted about the second y-axis by pivoting the hinge about the fulcrum axis while maintaining the male member at a fixed position.

The present invention may also include a method for shielding sunlight in an existing vehicle. The method may include the chronological steps of first providing a single and unitary body. Secondly, the method may include providing and spacing a bracket from the body by removably attaching the bracket to a portion of the existing vehicle sun visor. Finally, the method may include freely articulating the body along an x-axis and a first y-axis and a z-axis while simultaneously pivoting the bracket about a second y-axis respectively. The first and second y-axes preferably are registered orthogonal to a longitudinal length of the body while the x-axis may be registered parallel to the longitudinal length of the body. The first and second y-axes may also be spaced apart and intermediately situated between the bracket and the body.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a perspective view of an auxiliary sun visor attachment showing the first and second Y-axes as well as the X-axis, in accordance with the present invention;

FIG. 2 is a rear elevational view of the apparatus in FIG. 1, showing the X-axis;

FIG. 4 is a perspective view showing the present invention removably attached to an existing vehicle sun visor.

DETAILED DESCRIPTION OF THE INVENTION

Figure 3:
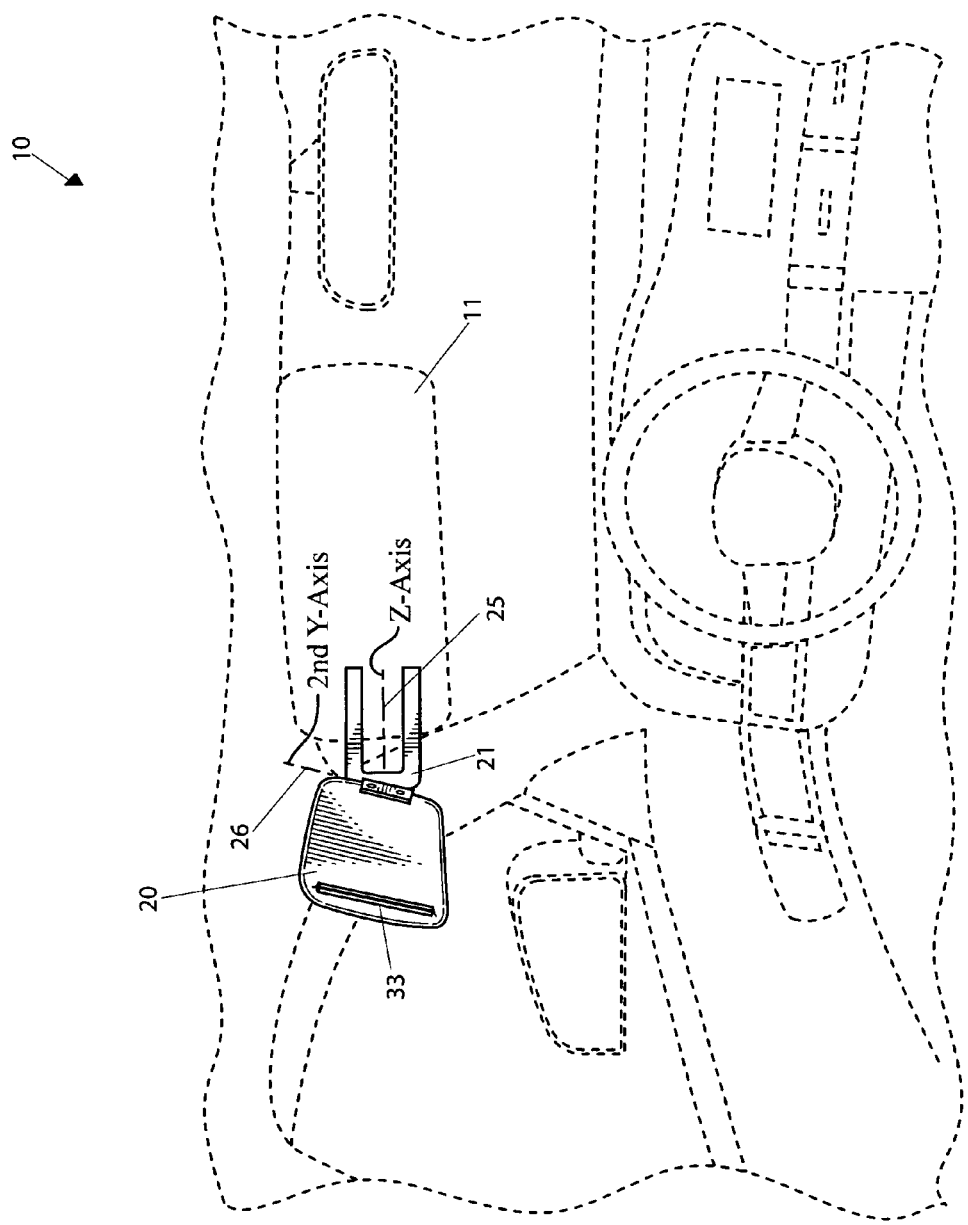
FIG. 3 is a perspective view of the body showing the panel slidably interfitted into the open end of the body.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-4 by the reference numeral 10 and is intended to provide an auxiliary sun visor attachment. It should be understood that the apparatus 10 may be used to block sunlight entering many different types of vehicles, including passenger cars, tractor-trailers, school buses, and the like, and should not be limited in use to the applications mentioned herein.

Referring initially to FIG. 1, an auxiliary sun visor 10 may include a single and unitary body 20. The sun visor 10 may also include a bracket 21 spaced from the body 20 and removably attached to a portion of the existing vehicle sun visor 11. Because the apparatus 10 may attach to the existing vehicle sun visor 11, the user will not be required to purchase additional equipment. Further, the visor 10 may include a mechanism 22 for freely articulating the body 20 along an x-axis 23 and a first 24 y-axis and a z-axis 25, while simultaneously pivoting the bracket 21 about a second 26 y-axis respectively. The first 24 and second 26 y-axes may be registered orthogonal to a longitudinal length of the body 20, while the x-axis 23 may be registered parallel to the longitudinal length of the body 20.

In addition, the first 24 and second 26 y-axes may be spaced apart and intermediately situated between the bracket 21 and the body 20. The apparatus 10 may block sun light from entering a vehicle from multiple directions. In attaching to the existing vehicle sun visor 11, the present invention may eliminate the need to continually reposition the existing vehicle sun visor 11 while driving when the sun changes position in the sky. For example, if the user drives on a winding road, sunlight may enter the vehicle through the front windshield when the user drives in one direction and may enter through the side window when the user drives in another direction. While the existing visor 11 blocks sunlight from entering the vehicle through the front windshield, the present invention simultaneously blocks the sunlight from the side of the vehicle, thus allowing the user to safely focus on driving.

Referring to FIGS. 1 and 4, respective distal ends 27, 28 of the bracket 21 and the body 20 may remain spaced apart at a first distance when the body 20 and the bracket 21 are oriented at a coplanar relationship with each other. Such respective distal ends 27, 28 of the bracket 21 and the body 20 may also remain spaced apart at a second distance when the body 20 and the bracket 21 are oriented at a non-planar relationship with each other.

In the preferred embodiment, the first distance may be greater than the second distance. Thus, when the body 20 is moved about the axes by the user, the distal end 28 of the body 20 may be positioned closer or farther away from the distal end 27 of the bracket 21. This allows the user to angle the body 20 in a variety of positions to advantageously block sunlight from different angles. In this manner, use of the apparatus 10 ensures that the driver can safely see the road ahead, as well as oncoming traffic approaching from the side, even during instance sunlight.

Referring now to FIG. 2, the body 20 of the visor 10 may further include a chamber located therein. Such a chamber may have at least one open end 31 located at a distal end 28 of the body 21. Additionally, a panel 33 may be slidably interfitted within the chamber 30. Such a panel 33 may be selectively retracted outwardly from one open end 31 thereof. Although the chamber is not pictured in the figures, one skilled in the art understands the position of the chamber within the body 20 is indicated by the open end 31.

The combined elements of the slidably panel 33 and the body 20 provide a benefit wherein the user may extend the coverage of the sun visor 10 to block out additional sunlight. By blocking the sun's harmful ultra-violet rays, use of the assembly 10 protects the eyes from potential dangerous overexposure to the sun.

Referring to FIGS. 1, 3, and 4, the bracket 21 of the visor 10 preferably is U-shaped and may include a plurality of clips 34 attached to lateral ends thereof. Each of the clips 34 may have a plurality of teeth 35 used to grip about the existing vehicle sun visor 11 so that the bracket 21 may remain statically engaged therewith while the body 20 may be freely articulated along the x-axis 23 and the first 24 y-axis and the z-axis 25 respectively. One skilled in the art understands that the teeth 35 may be formed from materials that are strong yet will not damage the upholstery of the existing vehicle sun visor.

The brackets 21, clips 34 and teeth 35 allow the sun visor apparatus 10 to removably attach to a wide variety of existing vehicle sun visors 11. Thus, if the user transfers from a first vehicle to a second vehicle, the user may remove the apparatus 10 from the first vehicle and attach the apparatus 20 to the second vehicle, for example. In this manner, users may not need to purchase a separate product for each existing vehicle.

The freely articulating mechanism 22 of the visor 10 may further include a ball joint 36. Such a ball joint 36 may have a female member 37 statically affixed to the proximal end 70 of the body 20 and a male member 38 rotatably attached to the female member 37. A hinge 39 may also be included and statically affixed to the male member 38 and the bracket 21 respectively. Such a hinge 39 may have a fulcrum axis defined along the second y-axis 26. The x-axis 23 and the y-axis 24 and the z-axis 25, about which the body 20 may travel, preferably intersect at the ball joint 36.

Additionally, the ball joint 36 and the hinge 39 preferably are pivotally affixed to each other such that the body 20 and the bracket 21 may be independently rotated with respect to each other by independently articulating the ball joint 36 and the hinge 39 respectively. The body 20 preferably is freely biased along the x-axis 23 and the y-axis 24 and the z-axis 25 while the hinge 39 may be maintained at a fixed position.

Further, the bracket 21 may be pivoted about the x-axis 23 by rotating the male member 38 with respect to the female member 37. The bracket 21 may also be pivoted about the second y-axis 26 by pivoting the hinge 39 about the fulcrum axis while maintaining the male member 38 at a fixed position. In pivoting the apparatus about the second y-axis 26, the body 20 may be positioned to block sunlight from entering the side window of a vehicle. Although conventional vehicle sun visors may be rotatably adjusted to block sunlight from either entering the windshield or the side window, the present invention attaches to a vehicle sun visor in order to advantageously block sunlight from entering through a side window while the existing sun visor blocks sunlight from entering through the windshield. This feature prevents the user from having to dangerously adjust the existing sun visor while driving.

In use, the method for shielding sunlight in an existing vehicle may include the first step of providing a single and unitary body 20. Secondly, the method may include providing and spacing a bracket 21 from the body 20 by removably attaching the bracket 21 to a portion of the existing vehicle sun visor 11. Finally, the method may include freely articulating the body 20 along an x-axis 23 and a first y-axis 24 and a z-axis 25 while simultaneously pivoting the bracket 21 about a second y-axis 26 respectively. The first 24 and second 26 y-axes preferably are registered orthogonal to a longitudinal length of the body 20 while the x-axis 23 may be registered parallel to the longitudinal length of the body 20. The first 24 and second 26 y-axes may also be spaced apart and intermediately situated between the bracket 21 and the body 20.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An auxiliary sun visor for cooperating with an existing sun visor and thereby shielding sunlight in an existing vehicle, said auxiliary sunlight visor comprising:

a body;

a bracket spaced from said body and removably attached to a portion of the existing vehicle sun visor; and means for freely articulating said body along an x-axis and a first y-axis and a z-axis while simultaneously pivoting said bracket about a second y-axis respectively;

wherein said first and second y-axes are registered orthogonal to a longitudinal length of said body, said x-axis being registered parallel to the longitudinal length of said body;

wherein said first and second y-axes are spaced apart and intermediately situated between said bracket and said body;

wherein respective distal ends of said bracket and said body remain spaced apart at a first distance when said body and said bracket are oriented at a coplanar relationship with each other;

wherein said respective distal ends of said bracket and said body remain spaced apart at a second distance when said body and said bracket are oriented at a non-planar relationship with each other;

wherein said first distance is greater than said second distance;

where said body further comprises a chamber located therein, said chamber having at least one open end located at a distal end of said body; and a panel slidably interfitted within said chamber, said panel being selectively retracted outwardly from said at least one open end thereof;

wherein said bracket is U-shaped and comprises a plurality of clips attached to lateral ends thereof, each of said clips having a plurality of teeth gripped about the existing vehicle sun visor so that said bracket remains statically engaged therewith while said body is freely articulated along the x-axis and the first y-axis and the z-axis respectively.

2. The auxiliary sunlight visor of claim 1, wherein said freely articulating means comprises:

a ball joint having a female member statically affixed to said proximal end of said body, said ball joint further having a male member rotatably attached to said female member; and a hinge statically affixed to said male member and said bracket respectively, said hinge having a fulcrum axis defined along the second y-axis;

wherein the x-axis and the y-axis and the z-axis intersect at said ball joint.

3. The auxiliary sunlight visor of claim 2, wherein said ball joint and said hinge are pivotally affixed to each other such that said body and said bracket are independently rotated with respect to each other by independently articulating said ball joint and said hinge respectively;

wherein said body is freely biased along the x-axis and the y-axis and the z-axis while said hinge is maintained at a fixed position.

4. The auxiliary sunlight visor of claim 2, wherein said bracket is pivoted about the x-axis by rotating said male member with respect to said female member, wherein said bracket is pivoted about the second y-axis by pivoting said hinge about the fulcrum axis while maintaining said male member at a fixed position.

5. The auxiliary sunlight visor of claim 2, wherein said female member is respectively rotated in sync with said body along the x-axis and the y-axis and the z-axis while said male member remains at a static position.

* * * * *